United States Patent
Ofuji et al.

(10) Patent No.: US 8,442,546 B2
(45) Date of Patent: May 14, 2013

(54) RADIO BASE STATION AND COMMUNICATION CONTROL METHOD

(75) Inventors: Yoshiaki Ofuji, Yokosuka (JP); Hiroyuki Ishii, Yokohama (JP); Naoto Okubo, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 87 days.

(21) Appl. No.: 13/142,095

(22) PCT Filed: Dec. 18, 2009

(86) PCT No.: PCT/JP2009/071163
§ 371 (c)(1),
(2), (4) Date: Aug. 23, 2011

(87) PCT Pub. No.: WO2010/074004
PCT Pub. Date: Jul. 1, 2010

(65) Prior Publication Data
US 2011/0294439 A1    Dec. 1, 2011

(30) Foreign Application Priority Data
Dec. 24, 2008   (JP) ................................ 2008-328518

(51) Int. Cl.
*H04W 72/00*   (2009.01)

(52) U.S. Cl.
USPC ............ 455/452.2; 455/450; 455/452.1; 455/67.11; 455/67.13; 455/67.15; 455/68; 455/69; 455/522; 455/561; 370/252; 370/341; 370/464; 370/465; 370/468

(58) Field of Classification Search .............. 455/452.1, 455/452.2, 450, 67.11, 67.13, 67.15, 68, 455/69, 561, 522; 370/252, 341–345, 464, 370/465, 468
See application file for complete search history.

(56) References Cited

U.S. PATENT DOCUMENTS

| | | | | |
|---|---|---|---|---|
| 7,257,423 | B2 * | 8/2007 | Iochi | 455/561 |
| 7,277,492 | B2 * | 10/2007 | Itoh | 375/259 |
| 7,400,674 | B2 * | 7/2008 | Gu | 375/225 |
| 7,471,928 | B2 * | 12/2008 | Axnas et al. | 455/69 |
| 7,486,634 | B2 * | 2/2009 | Itoh | 370/318 |
| 7,508,748 | B2 * | 3/2009 | Kadous | 370/208 |
| 7,764,931 | B2 * | 7/2010 | Kim et al. | 455/69 |
| 7,978,724 | B1 * | 7/2011 | Mansour et al. | 370/436 |
| 8,107,418 | B2 * | 1/2012 | Oh | 370/328 |
| 2009/0016278 | A1 | 1/2009 | Wakabayashi | |

FOREIGN PATENT DOCUMENTS

| | | |
|---|---|---|
| JP | 2005-051684 A | 2/2005 |
| JP | 2005-318470 A | 11/2005 |
| JP | 2008-193439 A | 8/2008 |
| WO | 2006/013630 A1 | 2/2006 |

OTHER PUBLICATIONS

International Search Report issued in PCT/JP2009/071163, mailed on Mar. 23, 2010, with translation, 2 pages.

* cited by examiner

*Primary Examiner* — Tuan A Tran
(74) *Attorney, Agent, or Firm* — Osha Liang LLP

(57) ABSTRACT

A radio base station (eNB) according to the present invention includes: a calculation unit (12) configured to calculate an adjusted value of a reception quality, based on the reception quality in a specific mobile station in at least one first resource block assigned to the specific mobile station in a PUSCH, and the number of resource elements assigned to transmission of dedicated control information in the first resource blocks; and a selection unit (13) configured to select, based on the adjusted value of the reception quality, the number of bits which can be transmitted and a modulation scheme that should be used in the first resource blocks.

11 Claims, 4 Drawing Sheets

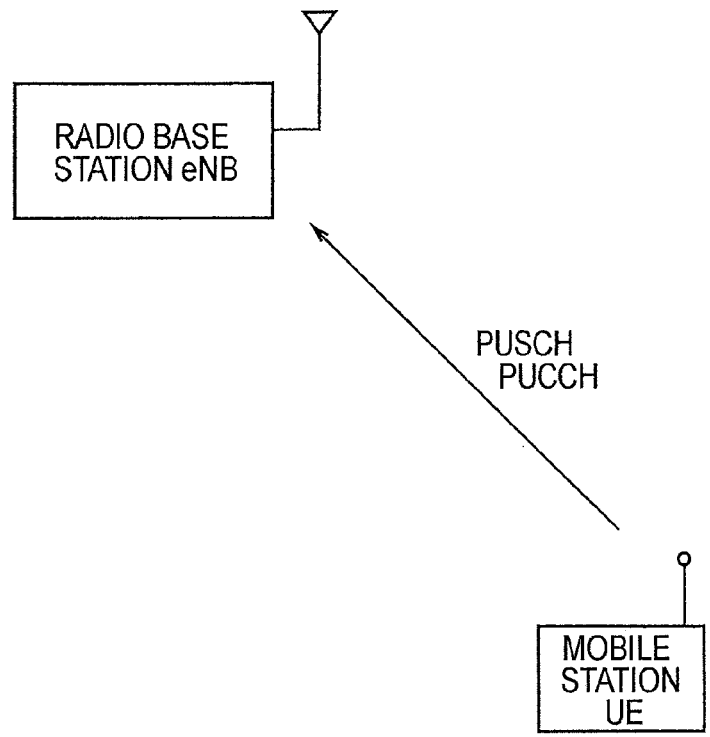
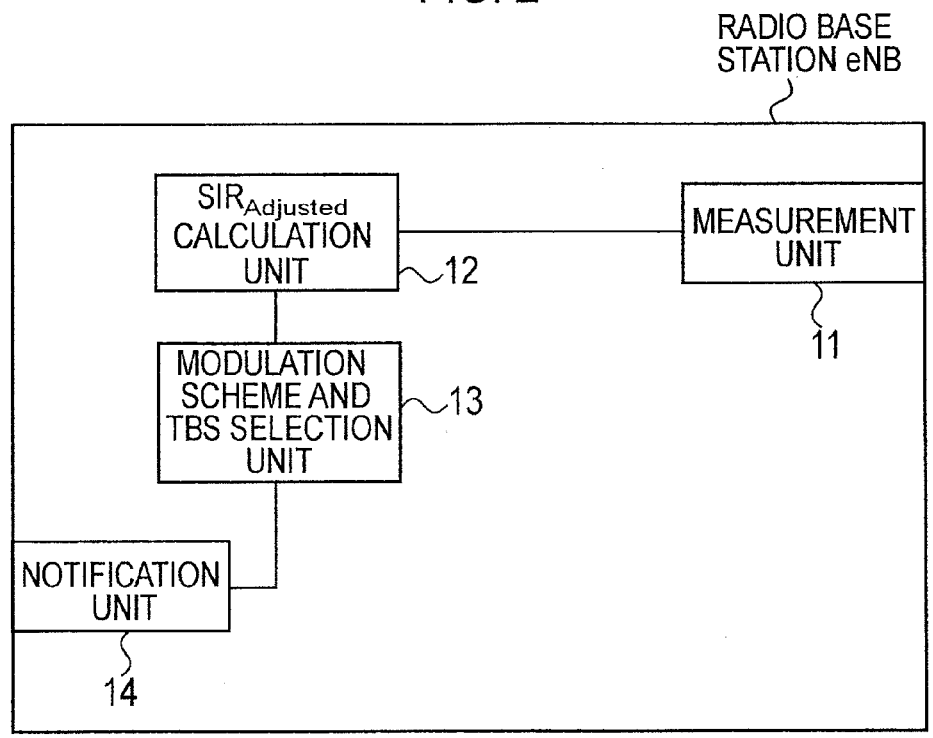

FIG. 3

| SIR | TBS | MODULATION SCHEME |
|---|---|---|
| $SIR_1$ | $TBS_1$ | A |
| $SIR_2$ | $TBS_2$ | B |
| ⋮ | ⋮ | ⋮ |

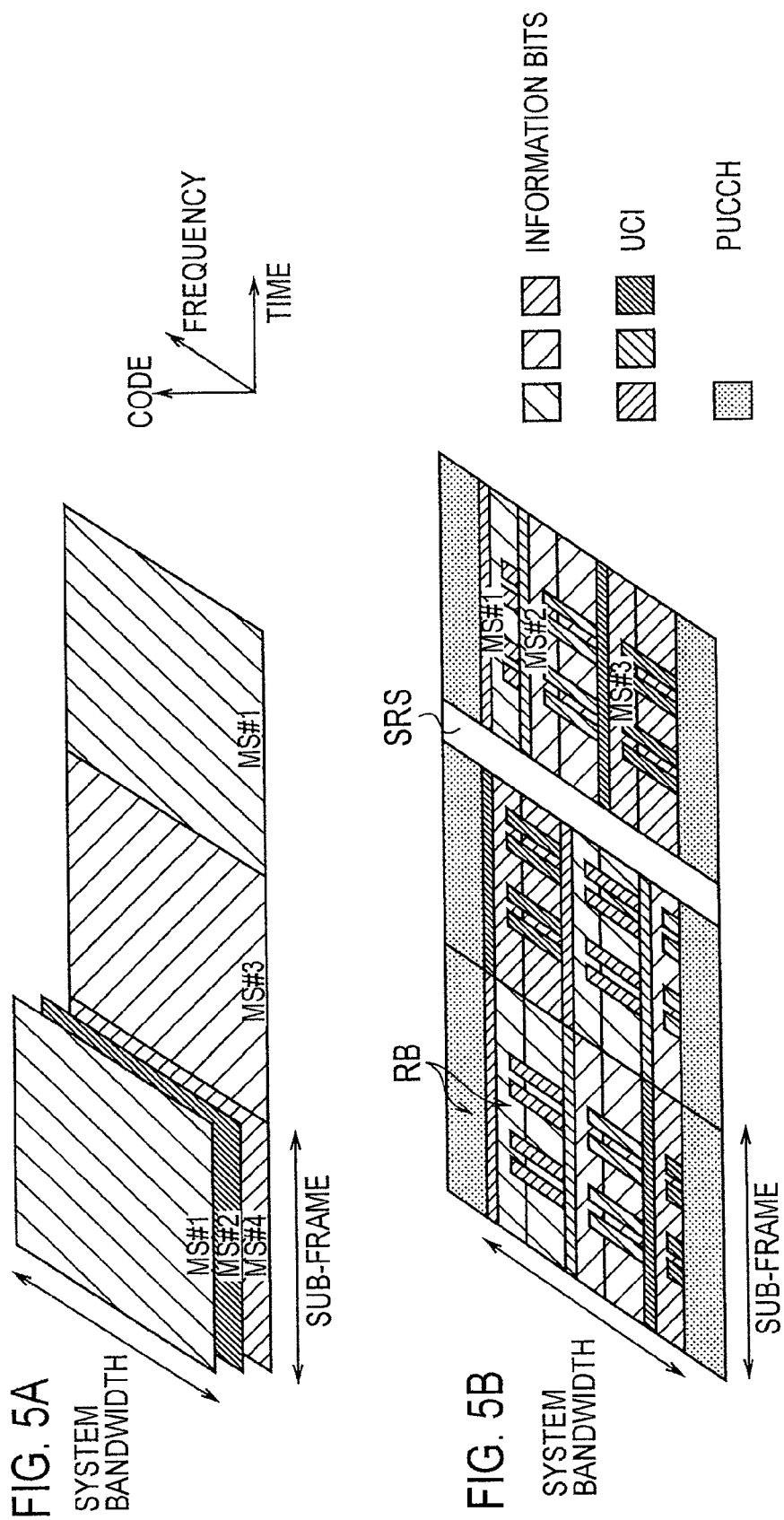

RADIO BASE STATION AND COMMUNICATION CONTROL METHOD

TECHNICAL FIELD

The present invention relates to a radio base station configured to receive from a mobile station information data transmitted by using a resource block assigned to the mobile station in an uplink shared channel, and relates also to a communication control method.

BACKGROUND ART

In the LTE (Long Term Evolution) scheme defined in the 3GPP, the "AMC (Adaptive Modulation and Coding) control" is applied in which a radio base station Enb controls a modulation scheme or a channel coding rate of the uplink shared channel (PUSCH: Physical Uplink Shared Channel), based on a reception quality (e.g., received power, a signal-to-interference ratio (SIR), a signal-to-interference-plus-noise ratio (SINR), and a path loss) in a measured uplink.

In this case, in a certain modulation scheme, TBS (Transport Block Size), which is the number of bits that can be transmitted by a predetermined frequency resource per unit time (e.g., a radio resource in resource block unit), is determined according to a channel coding rate.

Therefore, in the AMC control of the uplink of the LTE scheme, it is configured to control the modulation scheme and TBS, based on the reception quality of the uplink such as the reception SIR.

In this case, as illustrated in FIG. 5(a), in the HSDPA (High Speed Downlink Packet Access) scheme defined in the 3GPP, a code resource (radio resource) for the downlink shared data channel (HS-DSCH: High Speed Downlink Shared Channel) is configured to be assigned to each mobile station MS by each time slot, and an assignment unit of the radio resource is constant.

On the other hand, as illustrated in FIG. 5(b), in an uplink of the LTE (Long Term Evolution) scheme defined in the 3GPP, a radio resource for PUSCH is configured to be assigned to each mobile station MS by each time slot (sub-frame).

The radio resource in the uplink of the LTE scheme is configured to be assigned to the uplink shared channel in resource block unit in which a system bandwidth is divided by each predetermined bandwidth.

Specifically, the resource block is a minimum assignment unit of a radio resource for an uplink shared channel defined in a two-dimensional plane represented by a frequency direction and a time direction, and is configured by seven SC (Single Carrier)-FDMA symbols in the time direction and twelve sub-carriers in the frequency direction.

It is noted that an element configuring the resource block is referred to as "resource element", and each resource block is configured by 12×7 resource elements (=SC-FDMA symbols).

In the uplink of the LTE scheme, the mobile station UE transmits control information (transmission acknowledgement information for the downlink shared channel, reception quality information (Channel Quality Indicator), a Scheduling Request, etc.) through PUCCH (Physical Uplink Control Channel) at a timing at which PUSCH is not transmitted.

However, in the LTE scheme, when uplink data and the control information are transmitted through PUSCH at the same timing, the uplink data channel and the control information are configured to be multiplexed on and mapped to the resource block assigned to the mobile station UE. And, the number of resource elements to which the control information is mapped varies depending on an amount of the control information to be transmitted. As a result, the number of bits after channel coding in the uplink shared channel is changed and a channel coding rate in the uplink shared channel is differed even when the same modulation scheme and TBS are selected. This results in a problem that a desired transmission quality (e.g., BLER) cannot be realized.

Further, in the uplink of the LTE scheme, in order to maintain synchronization of the uplink and to measure a radio channel state in the uplink at the radio base station, the mobile station UE transmits a reference signal that is referred to as "Sounding Reference Signal (SRS)". The SRS is multiplexed on an SC-FDMA symbol at the tail end of a specific sub-frame designated by the radio base station.

Therefore, the number of resource elements that can be used in the uplink shared channel varies depending on whether or not the SRS is multiplexed including SRS at another mobile station, and a channel coding rate in the uplink shared channel is differed even when the same modulation method and TBS are selected. As a result, there is a problem that the desired transmission quality (e.g., BLER) cannot be realized.

Therefore, the present invention is intended to overcome the above-described problem. An object of the present invention is to provide a radio base station capable of realizing a desired transmission quality (e.g., BLER) in the uplink data channel even when the number of resource elements to which control information is mapped is not constant and irrespective of whether SRS is multiplexed in the same sub-frame, and to provide a communication control method herefore.

SUMMARY OF THE INVENTION

A first aspect of the present invention is summarized as a radio base station configured to transmit to a specific mobile station a control signal instructing to transmit information data in an uplink shared channel, and to receive from the specific mobile station the information data transmitted by using first resource blocks assigned to the specific mobile station in the uplink shared channel, the radio base station including: a calculation unit configured to calculate an adjusted value of a reception quality, based on the reception quality of a transmission signal of the specific mobile station in at least one first resource block assigned to the specific mobile station out of radio resources for the uplink shared channel, and the number of resource elements assigned to transmission of control information or transmission of Sounding Reference Signal in the first resource blocks; a selection unit configured to select, based on the adjusted value of the reception quality, the number of bits which can be transmitted and a modulation scheme that should be used in the first resource blocks; and a transmission unit configured to transmit the number of bits and the modulation scheme that should be used in the first resource blocks, as one portion of the control signal.

As described above, according to the present invention, it is possible to provide a radio base station capable of realizing a desired transmission quality (e.g., BLER) in an uplink data channel even when the number of resource elements to which individual control information is mapped is not constant, and to provide a communication control method herefore.

BRIEF DESCRIPTION OF THE DRAWINGS

FIG. 1 is a diagram showing the entire configuration of a mobile communication system according to a first embodiment of the present invention.

FIG. 2 is a functional block diagram of a radio base station according to the first embodiment of the present invention.

FIG. 3 is a table illustrating one example of a correspondence table among "SIR", "TBS", and "modulation scheme" managed by the radio base station according to the first embodiment of the present invention.

FIG. 5 is a diagram illustrating one example of a method of assigning a radio resource to a downlink shared data channel in an HSDPA scheme and a physical uplink shared channel in an LTE scheme.

DETAILED DESCRIPTION

Figure 4:
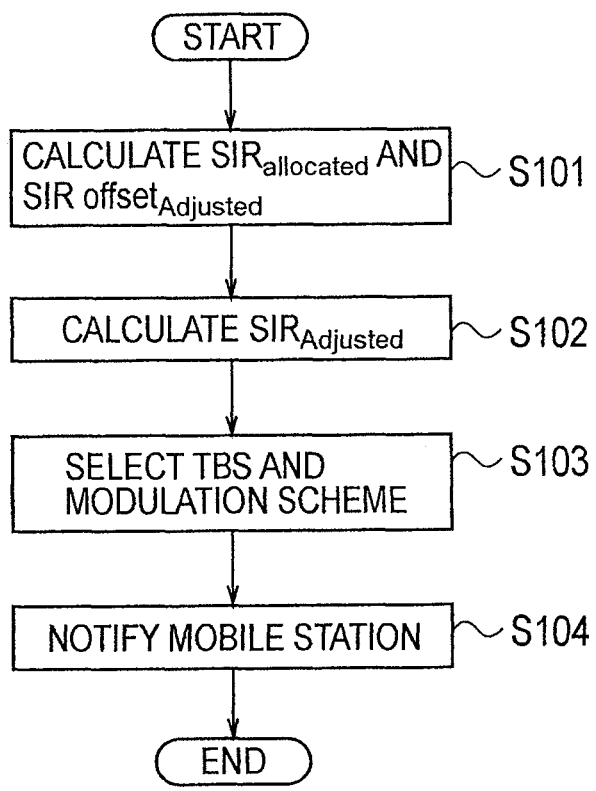
FIG. 4 is a flowchart illustrating an operation in which the radio base station according to the first embodiment of the present invention receives information data via an uplink channel.

Configuration of Mobile Communication System According to First Embodiment of the Present Invention With reference to FIG. 1 to FIG. 3, the configuration of a mobile communication system according to a first embodiment of the present invention will be explained.

As illustrated in FIG. 1, the mobile communication system according to the embodiment is a mobile communication system of the LTE scheme, and includes a radio base station eNB and a mobile station UE.

In the mobile communication system according to this embodiment, as a radio access scheme, the "OFDM (Orthogonal Frequency Division Multiplexing) scheme" is applied for a downlink, and the "SC-FDMA (Single-Carrier Frequency Division Multiple Access) scheme" is applied for an uplink.

The OFDM scheme is a scheme that a specific frequency band is divided into a plurality of sub-carriers and data is loaded on the sub-carriers for transmission. According to the OFDM scheme, the sub-carriers are densely arranged on the frequency axis without interference therebetween although a part of the sub-carriers overlap each other, so that high-rate transmission can be achieved and frequency use efficiency can be improved.

The SC-FDMA scheme, a specific frequency band is divided and a plurality of mobile stations UE transmit data using different frequency bands, so that it is possible to reduce interference among the plurality of mobile stations UE According to the SC-FDMA scheme, because of its characteristic of small variation in transmission power, it is possible to achieve low power consumption and broad coverage of the mobile station UE.

In the mobile communication system according to this embodiment, the mobile station UE transmits PUSCH, PUCCH (Physical Uplink Control Channel), etc., to the radio base station eNB in the uplink.

A data signal is transmitted by the PUSCH, and control information is transmitted by the PUCCH. In the control information, transmission acknowledgement information relating to the downlink shared channel (ACK information), reception quality information of the downlink (Channel Quality Indicator: CQI), a rank indicator, a scheduling request signal (Scheduling Request), etc., are included.

It is noted that when the data signal and the control information are both transmitted in the same sub-frame, the data signal and the control information are multiplexed in the PUSCH and then transmitted. In this case, the number of resource elements to which the data signal is mapped is decreased by as much as the resource elements to which the control information is mapped.

Further, the transmission of the PUSCH by the mobile station UE is performed based on PDCCH transmitted from the radio base station eNB in the downlink. That is, when the mobile station UE receives PDCCH instructing to the mobile station to transmit PUSCH UE, the mobile station UE transmits PUSCH at a predetermined timing.

In this case, in the PDCCH instructing to transmit the PUSCH, a frequency resource of the PUSCH, i.e., information on a resource block, a modulation scheme, data size, etc., are included. The PDCCH instructing to transmit the PUSCH may be referred to as "UL Scheduling Grant". As a format of the Downlink Control Information, "Format 0" may be used.

In the downlink, the radio base station eNB transmits PDCCH (Physical Downlink Control Channel), PDSCH (Physical Downlink Shared Channel), etc., to the mobile station UE.

As illustrated in FIG. 2, the radio base station eNB includes a measurement unit 11, an $SIR_{Adjusted}$ calculation unit 12, a modulation scheme and TBS selection unit 13, and a notification unit 14.

The measurement unit 11 is configured to measure a reception quality in the uplink about each mobile station UE at a predetermined timing.

In this embodiment, SIR, which represents the reception quality, will be explained; however, the present invention can be applied to a case where an index of another reception quality is used, below. For example, the reception quality may be calculated by using a reference signal for sounding, or may be calculated by using a reference signal for demodulation.

The $SIR_{Adjusted}$ calculation unit 12 is configured to calculate an adjusted value of the SIR "$SIR_{adjusted}$", based on SIR "$SIR_{allocated}$" in at least one first resource block assigned to the mobile station UE in PUSCH (uplink shared channel), and the number of resource elements assigned to either transmission of the above-described control information or to multiplexing of the Sounding Reference Signal within the first resource blocks.

A calculation method 1 of an adjusted value of the SIR "$SIR_{Adjusted}$" in the first resource blocks corresponding to the number of resource elements assigned to the transmission of the control information, a calculation method 2 of an adjusted value of the SIR "$SIR_{Adjusted}$" in the first resource blocks corresponding to the number of resource elements assigned to the multiplexing of the Sounding Reference Signal, and a calculation method 3 of an adjusted value of the SIR "$SIR_{Adjusted}$" in the first resource blocks corresponding to the number of resource elements assigned to the transmission of the control information and the multiplexing of the Sounding Reference Signal will be respectively explained, below.

Firstly, the above-described calculation method 1 will be explained. In the calculation method 1, the $SIR_{Adjusted}$ calculation unit 12 is configured to calculate the adjusted value of the SIR "$SIR_{Adjusted}$" according to "$SIR_{Adjusted} = SIR_{allocated} + SIR\_offset - \Delta_{Control\_resource}$".

In this case, the "$\Delta_{Control\_resource}$" denotes a parameter calculated based on the number of resource elements assigned to the transmission of the control information within the above-described first resource blocks.

Further, the "SIR_offset" denotes an offset value that increases and decreases according to a reception result (OK/NG) at the radio base station eNB of the information data transmitted via PUSCH from the mobile station UE.

That is, the $SIR_{Adjusted}$ calculation unit 12 may be configured to adjust the "SIR_offset", based on a reception result (OK/NG/DTX) in PUSCH assigned to each mobile station UE, as represented in Equation (1).

SIR_offset=SIR_offset+$\Delta_{adj}\times$BLER$_{target}$,Input="Ack"

SIR_offset=SIR_offset−$\Delta_{adj}\times$(1−BLER$_{target}$), Input="Nack"

SIR_offset=SIR_offset,Input="DTX"  [Equation 1]

In this case, the "DTX" means a determination result that "PUSCH is not transmitted from the mobile station", and this means for the mobile station to have made a mistake of detecting PDCCH (UL Scheduling Grant) that instructs to transmit the PUSCH. In this case, the mobile station does not detect the instruction of transmitting the PUSCH to the mobile station, and as a result, the mobile station will not transmit the PUSCH.

Further, the "$\Delta_{adj}$" and the "BLER$_{target}$" are a parameter for adjusting the "SIR_offset". The "BLER$_{target}$" may be an error rate of a target of the PUSCH.

Moreover, the "SIR_offset" may be calculated based on priority of the information data transmitted via PUSCH, for example, a logical channel group mapped to PUSCH. For example, the "SIR_offset" may be adjusted based on the priority of the logical channel group (Logical Channel Group Priority) transmitted via PUSCH as represented by the following equation.

SIR_offset=SIR_offset−$\Delta_{priority}$  [Equation 1A]

In the above equation, the "$\Delta_{priority}$" denotes an offset value set to each logical channel group in which logical channels transmitted via PUSCH are classified. For example, when DCCH is transmitted, the setting may be "$\Delta_{priority}$=1 dB". In this case, an apparent SIR becomes small, and thus, the error rate of the PUSCH becomes small. As a result, the error rate of the DCCH can be decreased and a delay of C-plane can be decreased.

It is noted that generally, the priority is imparted to the logical channel group. That is, the above-described "SIR_offset" is applied to each logical channel group, and as a result, it becomes possible to perform a process of adjusting the SIR corresponding to the priority.

In the above-described description, the logical channel group (Logical Channel) is used as the priority; however, instead thereof, QoS, "QoS Class Identifier (QCI)", "Priority Class", and "Logical Channel Priority" may be used.

It is noted that both or only one of the adjustment of the "SIR_offset" based on the reception result (OK/NG/DTX) at the radio base station eNB of the information data transmitted via PUSCH from the above-described mobile station UE and the adjustment of the "SIR_offset" based on the priority of the logical channel group transmitted via PUSCH may be performed, or neither may be performed. In either case, a parameter "$\Delta_{Control\_resource}$" described later is calculated, and a process for calculating the adjusted value of the SIR "SIR$_{Adjusted}$" can be applied.

For example, the SIR Adjusted calculation unit 12 can calculate the parameter "$\Delta_{Control\_resource}$" according to the following two types of calculation methods.

In the first calculation method, the SIR$_{Adjusted}$ calculation unit 12 may be configured to refer to the following equation of:

$$\Delta_{Control\_resource} = -10\times\log_{10}\left(\frac{N_{RE}-N_{RE,Control\_resource}}{N_{RE}}\right) \quad \text{[Equation 2]}$$

Thereby, the parameter "$\Delta_{Control\_resource}$" can be calculated.

In this case, the "$N_{RE}$" denotes the number of resource elements within the above-described first resource blocks, and the "$N_{RE,Control\_resource}$" denotes the number of resource elements assigned to transmission of the control information within the above-described first resource blocks.

A radio resource amount for control information transmission is determined by the TBS and the modulation scheme of the shared data channel transmitted via assigned PUSCH, and an offset amount adjusting the quality of the data channel for the control channel.

Therefore, if the TBS, the modulation scheme, etc., to be used for the shared data channel are not yet determined, then it is difficult to exactly estimate the radio resource amount for control information transmission, and thus, the resource amount may be estimated from the number of control information bits to be transmitted as follows.

$$N_{RE,Control\_resource} = Num_{bit,control}\cdot\left[\frac{Coef_{adjust}}{10^{\frac{SIR_{allocated}+SIR\_offset}{10}}}\right] \quad \text{[Equation 2A]}$$

In this case, the "$Num_{bit,control}$" may be the number of bits before coding the control information that should be transmitted, and may be the number of bits after coding. Further, the "$Coef_{adjust}$" may be a correction coefficient, and may be an arbitrary parameter.

In the second calculation method, the SIR$_{Adjusted}$ calculation unit 12 may be configured to refer to the following equation of:

$$\frac{N_{RE}-N_{RE,Control\_resource}}{N_{RE}} < \frac{TBS_{(SIR_{allocated}+SIRoffset)-\Delta Control\_resource}}{TBS_{(SIR_{allocated}+SIRoffset)}} \quad \text{[Equation 3]}$$

Thereby, the maximum "$\Delta_{Control\_resource}$" that satisfies the above equation may be calculated as the parameter "$\Delta_{Control\_resource}$".

In the above equation, the "TBS$_x$" denotes TBS corresponding to an index value "x". That is, the SIR$_{Adjusted}$ calculation unit 12 is configured to manage the value of "TBS$_x$" corresponding to each index value "x".

Secondly, the above-described calculation method 2 will be explained. In the calculation method 2, the SIR$_{Adjusted}$ calculation unit 12 is configured to calculate the adjusted value of the SIR "SIR$_{Adjusted}$" according to "SIR$_{Adjusted}$=SIR$_{allocated}$+SIR_offset−$\Delta_{SRS}$".

In this case, the "$\Delta_{SRS}$" denotes a parameter calculated based on the number of resource elements assigned to multiplexing of the Sounding Reference Signal within the above-described first resource blocks.

For example, the SIR$_{Adjusted}$ calculation unit 12 can calculate the parameter "$\Delta_{SRS}$" according to the following two types of calculation methods.

In the second calculation method, the SIR$_{Adjusted}$ calculation unit 12 may be configured to refer to the following equation of:

$$\Delta_{SRS} = -10 \times \log_{10}\left(\frac{N_{RE} - N_{RE,SRS}}{N_{RE}}\right) \quad \text{[Equation 3A]}$$

Thereby, the parameter "$\Delta_{SRS}$" can be calculated.

In the above equation, the "$N_{RE}$" denotes the number of resource elements within the above-described first resource blocks, and the "$N_{RE,SRS}$" denotes the number of resource elements assigned to multiplexing of the Sounding Reference Signal within the above-described first resource blocks.

In the second calculation method, the $SIR_{Adjusted}$ calculation unit 12 may be configured to refer to the following equation of:

$$\frac{N_{RE} - N_{RE,SRS}}{N_{RE}} < \frac{TBS_{(SIR_{allocated} + SIRoffset) - \Delta SRS}}{TBS_{(SIR_{allocated} + SIRoffset)}} \quad \text{[Equation 3B]}$$

Thereby, the maximum "$\Delta_{SRS}$" that satisfies the above equation may be calculated as the parameter "$\Delta_{SRS}$".

Thirdly, the above-described calculation method 3 will be explained. In the calculation method 3, the $SIR_{Adjusted}$ calculation unit 12 is configured to calculate the adjusted value of the SIR "$SIR_{Adjusted}$" according to "$SIR_{Adjusted} = SIR_{allocated} + SIR\_offset - \Delta_{Control\_resource\&SRS}$".

In this case, the "$\Delta_{Control\_resource\&SRS}$" denotes a parameter calculated based on the number of resource elements assigned to the transmission of the control information and the multiplexing of the Sounding Reference Signal within the above-described first resource blocks.

For example, the $SIR_{Adjusted}$ calculation unit 12 can calculate the parameter "$\Delta_{Control\_resource\&SRS}$" according to the following two types of calculation methods.

In the third calculation method, the $SIR_{Adjusted}$ calculation unit 12 may be configured to refer to the following equation of:

$$\Delta_{Control\_resource\&SRS} = \quad \text{[Equation 3C]}$$
$$-10 \times \log_{10}\left(\frac{N_{RE} - N_{RE,Control\_resource} - N_{RE,SRS}}{N_{RE}}\right)$$

Thereby, the parameter "$\Delta_{Control\_resource\&SRS}$" can be calculated.

In the above equation, the "$N_{RE}$" denotes the number of resource elements within the above-described first resource blocks, and the "$N_{RE,SRS}$" denotes the number of resource elements assigned to multiplexing of the Sounding Reference Signal within the above-described first resource blocks.

In the third calculation method, the $SIR_{Adjusted}$ calculation unit 12 may be configured to refer to the following equation of:

$$\frac{N_{RE} - N_{RE,Control\_resource} - N_{RE,SRS}}{N_{RE}} < \quad \text{[Equation 3D]}$$
$$\frac{TBS_{(SIR_{allocated} + SIRoffset) - \Delta_{Control\_resource\&SRS}}}{TBS_{(SIR_{allocated} + SIRoffset)}}$$

Thereby, the maximum "$\Delta_{Control\_resource\&SRS}$" that satisfies the above equation may be calculated as the parameter "$\Delta_{Control\_resource\&SRS}$".

The modulation scheme and TBS selection unit 13 is configured to select the modulation scheme that should be used in the first resource blocks and the number of bits (TBS) that can be transmitted therein, based on the "number of first resource blocks" and the adjusted value of the SIR "$SIR_{Adjusted}$" calculated by the $SIR_{Adjusted}$ calculation unit 12.

For example, the modulation scheme and TBS selection unit 13 may be configured to refer to a correspondence table among "SIR", "TBS", and "modulation scheme" illustrated in FIG. 3, so as to select "TBS" and "modulation scheme" corresponding to the adjusted value of the SIR "$SIR_{Adjusted}$" calculated by the $SIR_{Adjusted}$ calculation unit 12 as the modulation scheme that should be used in the first resource blocks and the number of bits (TBS) that can be transmitted therein.

Here, the correspondence table is to be provided for each "number of first resource blocks".

The notification unit 14 is configured to notify the mobile station UE of the first resource blocks, and the modulation scheme and TBS selected by the modulation scheme and TBS selection unit 13 via the PDCCH.

Operation of the Mobile Communication System According to the First Embodiment of the Present Invention With reference to FIG. 4, in the mobile communication system according to the first embodiment of the present invention, an operation in which the radio base station eNB receives the information data (uplink data) transmitted from the mobile station UE, in PUSCH#1, by using the first resource blocks assigned to the mobile station UE will be explained.

As illustrated in FIG. 4, in step S101, the radio base station eNB calculates SIR "$SIR_{allocated}$" in a plurality of resource blocks #1 assigned to the mobile station UE and the adjusted value of the SIR_offset "$SIR\_offset_{Adjusted}$" via PUSCH#1.

Specifically, the radio base station eNB refers to the following equation of:

$$\Delta_{Control\_resource} = -10 \times \log_{10}\left(\frac{N_{RE} - N_{RE,Control\_resource}}{N_{RE}}\right) \quad \text{[Equation 4]}$$

Thereby, the parameter "$\Delta_{Control\_resource}$" is calculated, and the adjusted value of SIR_offset "$SIR\_offset_{Adjusted}$" is calculated according to "$SIR\_offset_{Adjusted} = SIR\_offset - \Delta_{Control\_resource}$".

In step S102, the radio base station eNB calculates the adjusted value of the SIR "$SIR_{Adjusted}$" according to "$SIR_{Adjusted} = SIR_{allocated} + SIR\_offset_{Adjusted}$".

In step S103, the radio base station eNB refers to the correspondence table among "SIR", "TBS", and "modulation scheme" provided for each "number of first resource blocks" illustrated in FIG. 3, so as to select the "TBS" and "modulation scheme" corresponding to the calculated adjusted value of SIR "$SIR_{Adjusted}$", as modulation scheme that should be used in the first resource blocks and the number of bits (TBS) that can be transmitted therein.

In step S104, the radio base station eNB notifies the mobile station UE via PDCCH of the first resource blocks and the selected modulation scheme and TBS.

It is noted that the radio base station eNB may be configured to perform the operation in FIG. 4 for each time slot (sub-frame).

In a second resource block notified via PDCCH, the mobile station transmits the information data in a predetermined time slot (sub-frame) by using the designated modulation scheme and TBS.

On the other hand, in the radio base station, the information data transmitted by the designated modulation scheme and TBS is received in the first resource blocks designated by PDCCH.

Operation and Effect of the Mobile Communication System According to the First Embodiment of the Present Invention)

According to the mobile station UE used in the mobile communication system according to the first embodiment of the present invention, even when the number of bits transmittable by each resource block is not constant, as in the LTE scheme, it is possible to realize the desired transmission quality in PUSCH.

The operation of the above-described radio base station eNB may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the radio base station eNB. As a discrete component, such a storing medium and processor may be arranged in the radio base station eNB.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A radio base station configured to transmit to a specific mobile station a control signal instructing to transmit information data in an uplink shared channel, and to receive from the specific mobile station the information data transmitted by using first resource blocks assigned to the specific mobile station in the uplink shared channel, the radio base station comprising:
a calculation unit configured to calculate an adjusted value of a reception quality, based on the reception quality of a transmission signal of the specific mobile station in at least one first resource blocks assigned to the specific mobile station out of radio resources for the uplink shared channel, and the number of resource elements assigned to transmission of control information or transmission of Sounding Reference Signal in the first resource blocks;
a selection unit configured to select, based on the adjusted value of the reception quality, the number of bits which can be transmitted and a modulation scheme that should be used in the first resource blocks; and
a transmission unit configured to transmit the number of bits and the modulation scheme that should be used in the first resource blocks, as one element of the control signal.

2. The radio base station according to claim 1, wherein the calculation unit is configured to calculate an adjusted value of the reception quality "$SIR_{Adjusted}$" according to "$SIR_{Adjusted}=SIR_{allocated}+SIR\_offset-\Delta_{Control\_resource}$",
when the "$SIR_{allocated}$" denotes the reception quality of the first resource blocks, the "$\Delta_{Control\_resource}$" denotes a parameter calculated based on the number of resource elements assigned to the transmission of dedicated control information within the first resource blocks, and the "SIR_offset" denotes an offset value that increases and decreases depending on a reception result of the information data at the radio base station.

3. The radio base station according to claim 2, wherein the calculation unit is configured to calculate the parameter "$\Delta_{Control\_resource}$" according to the following equation A:

$$\Delta_{Control\_resource} = -10 \times \log_{10}\left(\frac{N_{RE} - N_{RE,Control\_resource}}{N_{RE}}\right), \quad \text{[Equation A]}$$

when the "$N_{RE}$" denotes the number of resource elements within the first resource blocks, and the "$N_{RE,Control\_resource}$" denotes the number of resource elements assigned to the transmission of an uplink control channel within the first resource blocks.

4. The radio base station according to claim 2, wherein the calculation unit is configured to calculate the maximum "$\Delta_{Control\_resource}$" that satisfies the following equation B, as the parameter "$\Delta_{Control\_resource}$", $$\frac{N_{RE} - N_{RE,Control\_resource}}{N_{RE}} < \frac{TBS_{(SIR_{allocated}+SIRoffset)-\Delta Control\_resource}}{TBS_{(SIR_{allocated}+SIRoffset)}}, \quad \text{[Equation B]}$$

when the "$TBS_x$" denotes the number of bits corresponding to an index value "x", the "$N_{RE}$" denotes the number of resource elements within the first resource blocks in the first resource block, and the "$N_{RE,Control\_resource}$" denotes the number of resource elements assigned as a radio resource for the dedicated control information transmission within the first resource blocks.

5. The radio base station according to claim 1, wherein the calculation unit is configured to calculate the adjusted value of the reception quality "$SIR_{Adjusted}$" according to "$SIR_{Adjusted}=SIR_{allocated}+SIR\_offset-\Delta_{SRS}$",
when the "$SIR_{allocated}$" denotes the reception quality of the first resource blocks, the "$\Delta_{SRS}$" denotes a parameter calculated based on the number of resource elements assigned to the transmission of the Sounding Reference Signal within the first resource blocks, and the "SIR_offset" denotes the offset value that increases and decreases depending on a reception result, at the radio base station, of the information data transmitted via the uplink shared channel from the mobile station.

6. The radio base station according to claim 5, wherein the calculation unit is configured to calculate the parameter "$\Delta_{SRS}$" according to the following equation C:

$$\Delta_{SRS} = -10 \times \log_{10}\left(\frac{N_{RE} - N_{RE,SRS}}{N_{RE}}\right), \quad \text{[Equation C]}$$

when the "$N_{RE}$" denotes the number of resource elements within the first resource blocks, and the "$N_{RE,SRS}$" denotes the number of resource elements assigned to the transmission of the Sounding Reference Signal within the first resource blocks.

7. The radio base station according to claim 5, wherein the calculation unit is configured to calculate, as the parameter "$\Delta_{SRS}$", the maximum "$\Delta_{SRS}$" that satisfies the following equation D:

$$\frac{N_{RE} - N_{RE,SRS}}{N_{RE}} < \frac{TBS_{(SIR_{allocated} + SIRoffset) - \Delta_{SRS}}}{TBS_{(SIR_{allocated} + SIRoffset)}}, \quad \text{[Equation D]}$$

when the "$TBS_x$" denotes the number of bits corresponding to the index value "x", the "$N_{RE}$" denotes the number of resource elements within the first resource blocks in the first resource block, and the "$N_{RE,SRS}$" denotes the number of resource elements assigned to the transmission of the Sounding Reference Signal within the first resource blocks.

8. The radio base station according to claim 1, wherein the calculation unit is configured to calculate the adjusted value of the reception quality "$SIR_{Adjusted}$" according to "$SIR_{Adjusted} = SIR_{allocated} + SIR\_offset - \Delta_{Control\_resource\&SRS}$", when the "$SIR_{allocated}$" denotes the reception quality of the first resource blocks, the "$\Delta_{Control\_resource\&SRS}$" denotes the parameter calculated based on the number of resource elements assigned to the transmission of dedicated control information within the first resource blocks and the transmission of the Sounding Reference Signal, and the "SIR_offset" denotes the offset value that increases and decreases depending on the reception result, at the radio base station, of the information data transmitted via the uplink shared channel from the mobile station.

9. The radio base station according to claim 8, wherein the calculation unit is configured to calculate the parameter "$\Delta_{Control\_resource\&SRS}$" according to the following equation E:

$$\Delta_{Control\_resource\&SRS} = \quad \text{[Equation E]}$$
$$-10 \times \log_{10}\left(\frac{N_{RE} - N_{RE,Control\_resource} - N_{RE,SRS}}{N_{RE}}\right),$$

when the "$N_{RE}$" denotes the number of resource elements within the first resource blocks, and the "$N_{RE,Control\_resource\&SRS}$" denotes the number of resource elements assigned to the transmission of the dedicated control information within the first resource blocks and the transmission of the Sounding Reference Signal.

10. The radio base station according to claim 8, wherein the calculation unit is configured to calculate, as the parameter "$\Delta_{Control\_resource\&SRS}$", the maximum "$\Delta_{Control\_resource\&SRS}$" that satisfies the following equation F:

$$\frac{N_{RE} - N_{RE,Control\_resource} - N_{RE,SRS}}{N_{RE}} < \quad \text{[Equation F]}$$
$$\frac{TBS_{(SIR_{allocated} + SIRoffset) - \Delta Control\_resource\&SRS}}{TBS_{(SIR_{allocated} + SIRoffset)}},$$

when the "$TBS_x$" denotes the number of bits corresponding to the index value "x", the "$N_{RE}$" denotes the number of resource elements within the first resource blocks, and the "$N_{RE,Control\_resource\&SRS}$" denotes the number of the resource elements assigned to the transmission of the dedicated control information within the first resource blocks and the transmission of the Sounding Reference Signal.

11. A communication control method in a radio base station configured to transmit to a specific mobile station a control signal instructing to transmit information data in an uplink shared channel and to receive from the specific mobile station the information data transmitted by using a first resource blocks assigned to the specific mobile station in the uplink shared channel, the communication control method comprising:

a first step of calculating an adjusted value of a reception quality, based on the reception quality of a transmission signal of the specific mobile station in at least one first resource blocks assigned to the specific mobile station out of radio resources for the uplink shared channel, and the number of resource elements assigned to transmission of control information or transmission of Sounding Reference Signal within the first resource blocks; and a second step of selecting the number of bits which can be transmitted and a modulation scheme that should be used in the first resource blocks based on the adjusted value of the reception quality.

* * * * *